March 28, 1939.   J. H. ANDERSON   2,152,013
SLED
Filed Nov. 10, 1937

INVENTOR.
JOHN H. ANDERSON
BY G. H. Braddock
ATTORNEY

Patented Mar. 28, 1939

2,152,013

UNITED STATES PATENT OFFICE 2,152,013

SLED

John H. Anderson, St. Paul, Minn.

Application November 10, 1937, Serial No. 173,861

8 Claims. (Cl. 280—15)

This invention relates to a sled, and has more particular reference to devices including sled runners adapted for detachable association or assembly with a wagon as replacements for the wheels thereof to convert the wagon into a sled.

An object of the invention is to provide a sled, or sled devices, which will be of novel and improved construction.

A further object is to provide sled runner devices adapted to be detachably associated or assembled with an axle of a wagon, as upon skeins carried by said axle, in replacement of wheels of said wagon to convert the wagon into a sled, and in which sled will be incorporated improved features and characteristics of construction novel both as individual entities of the sled and in combination with each other.

And a further object is to provide a sled of the converted wagon type which will include novel and improved structure designed to render the sled an improvement generally over sleds of more or less similar nature heretofore of commerce.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Figure 1:
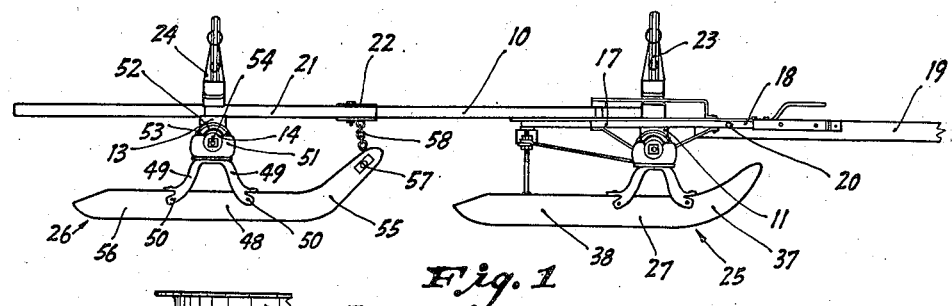
Fig. 1 is a side elevational view of a sled made according to the invention.
Figure 4:
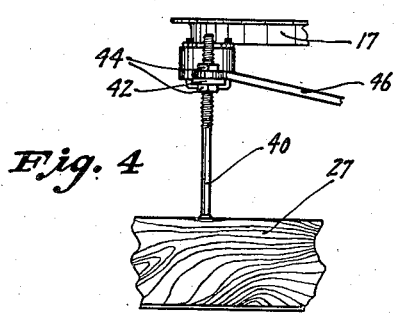
Fig. 4 is a detail elevational view of parts of the sled as said parts would appear when seen from the position indicated by line 4—4 in Fig. 2.
Figure 2:
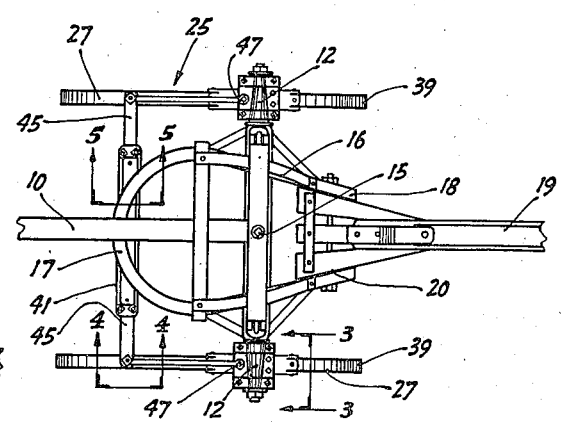
Fig. 2 is a fragmentary plan view, disclosing a forward portion of the sled of Fig. 1.
Figure 5:
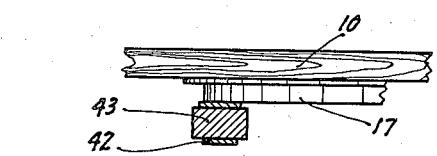
Fig. 5 is a detail sectional view of the sled, taken on line 5—5 in Fig. 2.
Figure 3:
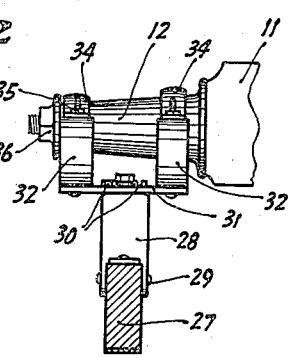
Fig. 3 is a detail sectional view of the sled, taken on line 3—3 in Fig. 2.
Figure 6:
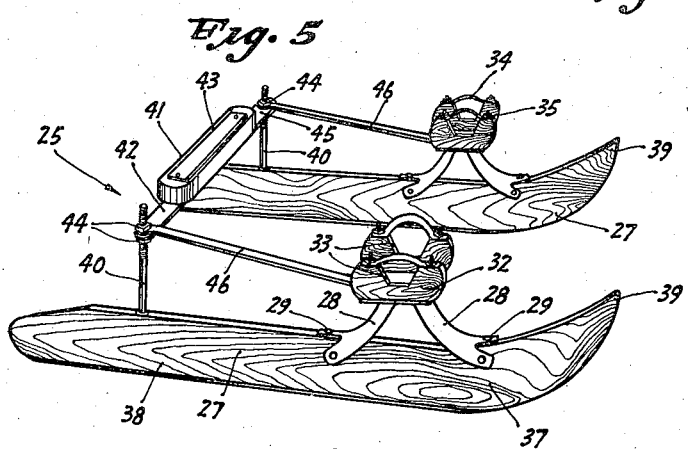
Fig. 6 is an enlarged perspective view of the forward sled runner devices of the sled of Fig. 1 removed from the remainder of the sled.

The sled herein disclosed is constructed by removal of the wheels of a wagon, which may be of any of a number of different types heretofore known and now of commerce, and application to the axles, or, more properly, to the skeins, of said wagon, as substitutes for the removed wheels, of sled runner devices. In the drawing there is disclosed a wagon, with wheels removed and sled runners applied, of but one of the different types which can be converted into a sled made according to the invention. An ordinary reach of said wagon, and of the sled when the sled runner devices have replaced the wagon wheels, is denoted by the numeral 10. At its forward portion the reach 10 is supported by a front axle 11, which front axle is in turn supported by right and left front wheels (not shown) when the vehicle is functioning as a wagon. The right and left front wheels are mounted upon ordinary skeins, indicated 12, fixed in any suitable and convenient manner upon the opposite end portions of said front axle 11, there being a front skein 12 at each side of the vehicle and the reach thereof. At its rearward portion said reach 10 is supported by a rear axle 13, which rear axle is in turn supported by right and left rear wheels (not shown) when the vehicle is functioning as a wagon. The right and left rear wheels are also mounted upon ordinary skeins, indicated 14, fixed in any suitable and convenient manner upon the opposite end portions of said rear axle 13, there being a rear skein 14 at each side of the vehicle and its reach. Said reach 10 extends longitudinally of the vehicle and is desirably spaced at equal distance from the front and rear skeins 12, 14 and 12, 14 at the right and the left sides, respectively, of said vehicle. That is, the reach 10 is at the longitudinal center of the vehicle. Each skein 12, 14 is as disclosed of general conical configuration, tapering outwardly in direction away from the axle which supports it, and the skeins are disposed to provide horizontal axes for the wagon wheels, as well as for sled runner devices of the invention when these are associated or assembled with said skeins, in a manner hereinafter to be set forth.

The front axle 11 is beneath the reach 10, and a vertical king pin 15, at the longitudinal center of said front axle and the transverse center of the vehicle, suitably and conveniently pivotally secures said reach and the front axle to each other in such manner that said front axle can have ordinary swinging movement in a horizontal plane relative to the vehicle and its reach required for forward and rearward movement in any selected direction. That is, the front axle 11 is rotatably connected to the reach 10 to make provision for propulsion of the vehicle in any forward or rearward direction.

An ordinary hound 16 is suitably and conveniently secured to the front axle 11. Said hound 16 is disposed in a horizontal plane and is desirably arranged at the transverse center of the vehicle. A part-circle, rearward portion 17 of the hound is disposed beneath and adjacent a forward portion of the reach 10 at location rearwardly of and in spaced relation to the front axle 11, and a forward portion 18 of said hound extends forwardly of said front axle. A wagon tongue or drafting shaft 19 of the vehicle, extending longitudinally of said vehicle desirably at its midwidth in alinement with or in the vertical plane of the reach 10, is suitably and conveniently secured, as at 20, to the forward portion 18 of the hound 16.

The rear axle 13 is also beneath the reach 10. Said rear axle is fixed against turning movement relatively to the reach, but is slidably adjustable longitudinally of said reach. As disclosed, a brace support 21 is interposed between the rear axle and the reach, and said brace support 21 is slidably connected to said reach in customary manner by an ordinary reach plate 22.

Usual bolsters, denoted 23 and 24, disposed above the reach 10 and above the front and rear axles 11 and 13, respectively, are for detachably supporting a body or box (not shown) to constitute a load receiving entity of the vehicle. The bolsters 23 and 24 can be associated with the vehicle in any suitable and convenient manner forming no part of the present invention.

When the convertible wagon-sled is functioning as a sled, forward sled runner devices, represented generally at 25, are associated or assembled with the front right and left skeins 12, 12, and rearward sled runner devices, represented generally at 26, are associated or assembled with the rear right and left skeins 14, 14.

The forward sled runner devices 25 includes parallel sled runners 27, 27, which are spaced apart substantially the same distance as are the front skeins 12, 12 and in the disclosure as made lie directly below said front skeins, respectively, when the vehicle is functioning as a sled. When the forward sled runners are in operation they are disposed longitudinally of the sled, and an intermediate portion of each sled runner 27 is detachably and rotatably or oscillatably mounted upon a skein 12 directly above the sled runner in order that said forward sled runners may have oscillatory movement as the vehicle or sled travels along. In the instance of each forward sled runner 27, spaced apart bracket elements 28 of curvilinear conformation are attached to the sled runner as at 29, and said bracket elements 28 extend upwardly from the sled runner and toward each other. The upper ends of the bracket elements 28, in the instance of each set of bracket elements 28, are secured, as at 30, to a small horizontally disposed plate 31 in supporting relation to said plate. In turn, each small plate 31 supports a pair of spaced apart cradle members 32, including a cradle member 32 at either side of the corresponding sled runner 27 and bracket members 28. Each cradle member 32 includes an upwardly facing bearing surface 33. The cradle members 32 are, in the instance of each set of cradle members, spaced apart a distance slightly less than the distance representing the length of each skein 12, and said skeins 12 rest upon and partially within the bearing surfaces 33 to thus be supported by the forward sled runners 27. In the instance of each set of cradle members 32, the bearing surface 33 of the outer cradle member of the set is disposed at a trifle higher elevation than is the bearing surface 33 of the inner cradle member of said set in order that all of said bearing surfaces of the different cradle members 32 may be engaged by the tapering skeins 12 in substantially the same manner. The cradle members 32 desirably may be constructed of wood, or other suitable material. Strap members 34, one for each cradle member 32, are bolted down upon the cradle members, as at 35, across the upper portions of the skeins 12 to insure that said skeins cannot become removed from said cradle members by jostling or bouncing vertical movement of the axle 11 relatively to the sled runners. The cradle members 32 are in the instance of each set of cradle members held upon the skeins against the possibility of becoming removed from said skeins by outward longitudinal movement thereon, by an ordinary wagon nut 36 removably threaded upon the outer end of the skein.

Each sled runner 27 includes a relatively short portion 37 thereof extending forwardly of the axle 11 and a comparatively longer portion 38 thereof extending rearwardly of said axle 11. The front end of the forward portion of each sled runner 27 desirably terminates at a location forwardly of the vehicle not in advance of the forward location at which the front wheels of said vehicle ordinarily terminate when the vehicle is used as a wagon. Stated otherwise, the front ends 39 of the forward sled runners 27 are desirably not forward of a vertical plane arranged transversely of the vehicle and disposed at a forward location of the vehicle to be tangential to the forward margins of its front wheels when said vehicle is used as a wagon. That is to say, the front ends of the forward sled runners are desirably at least as far back of the vehicle as are ordinary wheels of the vehicle when in use as a wagon, to thus offer no hinderance to draft animals hitched, in customary fashion, to the tongue or drafting shaft 19.

The rear end of the rearward portion 38 of each sled runner 27 terminates forwardly of the rearward sled runner devices 26, in spaced relation to said rearward sled runner devices. Said rearward portions 38 of the sled runners 27 are flexibly or resiliently associated with the vehicle, or, more properly, with the reach 10 and the hound 16 of said vehicle, both to allow the forward sled runners to oscillate upon their bearings and at the same time to preclude the possibility of said forward sled runners turning a complete revolution upon their bearings, as, for example, should the relatively short forward portions 37 hit obstructions to produce tendency toward causing said forward portions of the forward sled runners to be swung downwardly and the rearward portions 38 to be swung upwardly about the skeins 12, 12 as an axis. Although the flexible or resilient association of the rearward portions 38 of the forward sled runners with the vehicle to accomplish the aims as stated can be made in several different ways, as disclosed a threaded rod 40 is secured to and extends upwardly from an intermediate portion of the rearward portion 38 of each forward sled runner 27. The threaded rods 40 desirably are arranged in a single vertical plane extending transversely of the vehicle. A flexible or resilient entity 41 arranged horizontally and transversely of said vehicle consists of a lower flexible or resilient connector strip 42, which may be metal, and an upper rigid piece 43, which may be wood, or other suitable material, secured to said connector strip. The flexible or resilient connector strip 42 spans the distance between the upstanding threaded rods 40 and includes eyes at or openings in its opposite end portions slidably arranged upon said threaded rods. A set of lock nuts 44 upon each threaded rod 40, each set of lock nuts including a nut above and a nut below said connector strip 42, is for locating the connector strip upon the upstanding vertical rods at any elevation to which said connector strip may be adjusted. The rigid piece 43 is shorter than the flexible or resilient connector strip 42 and is situated at the longitudinal center of said connector strip to provide flexible or resilient portions 45 of the connector strip disposed between said rigid piece and the upright threaded rods. Evidently, the flexible or resilient portions 45 are of equal length. A tie or brace element of rod 46 connects the upper portion of each threaded rod 40 with the horizontal plate 31 carried by the corresponding forward sled runner 27. One end of each of elements or rods 46 may be secured to the plates 31 in any suitable and convenient way, as at 47. The end or each element or rod 46 opposite the cradle members 32 includes an eye or opening slidably arranged upon said threaded rods 40, and said elements or rods 46 are as disclosed situated between the lock nuts which locate the connector strip 42 upon the upright threaded rods, to thus be fastened to said upright rods.

The manner in which the forward sled runner devices function when the vehicle is in operation as a sled will be obvious. The rigid piece 43 will lie in adjacent relation to or contiguous relation with the under side of the vehicle, or the part-circle portion 17 of the hound, or the reach 10, beneath said hound and reach. The forward sled runners can evidently freely oscillate or rock upon the skeins 12 when there is tendency toward oscillation or rocking of the sled runners so that their rearward portions 38 move downwardly and their forward portions 37 move upwardly. However, in opposition to tendency of said forward sled runners to oscillate or rock in opposite direction, so that the rearward portions 38 move upwardly and the forward portions 37 move downwardly, upward movement of the rigid piece 43 will be resisted by the vehicle itself, and while the forward sled runners 27 can oscillate or rock in the direction last mentioned, by flexing or bending of the flexible or resilient portions 45 of the connector strip 42, oscillation or rocking of said forward sled runners so that their rearward portions could swing upwardly to an undue or undesirable extent causing the sled runners to turn over completely upon the skeins as axes will be precluded. That is, undue or undesirable oscillatory or swinging movement upwardly of the rearward portions 38 of the forward sled runners 27 will be precluded when the vehicle is in operation as a sled through the instrumentality of the cross entity 41 which has its upward movement limited by the vehicle itself and the threaded rods 40 which connect said rearward portions of the forward sled runners with and space said forward sled runners from said cross entity 41.

The rearward sled runner devices 26 include parallel sled runners 48, 48 which are spaced apart substantially the same distance as are the rear skeins 14, 14. Said sled runners 48 lie directly below the rear skeins when the vehicle is functioning as a sled. Also, the rearward sled runners 48 are disposed longitudinally of the sled. An intermediate portion of each sled runner 48 is detachably and rotatively or oscillatably mounted upon a skein 14 directly above the sled runner so that the rearward sled runners may also have oscillatory movement as the vehicle or sled is made to travel. In the instance of each rearward sled runner 48, spaced apart bracket elements 49 of curvilinear conformation are attached to the sled runners as at 50, and said bracket elements 49 extend upwardly from the sled runner and toward each other. The upper ends of the bracket elements 49, in the instance of each set of bracket elements 49, are secured to a small horizontally disposed plate, similar to the plates 31, in supporting relation to said plate. In turn, each small plate supports a pair of spaced apart cradle members 51, similar to the cradle members 32 and disposed beneath a skein 14 in the manner said cradle members 32 are disposed beneath the skeins 12. The cradle members 51 desirably may also be constructed of wood, or other suitable material. Strap members 52, similar to the strap members 34, are bolted down upon the cradle members 51, as at 53, across the upper portions of the skeins 14. Wagon nuts 54, similar to the wagon nuts 36, hold the cradle members 51 against longitudinal movement off of the skeins 14.

Each sled runner 48 includes a relatively long portion 55 thereof extending forwardly of the axle 13 and a comparatively shorter portion 56 thereof extending rearwardly of said axle 13. The front parts of the forward portions 55 are connected to each other by a cross member 57, and a chain 58 loosely connects the member 57 to the reach plate 22. Evidently, the rearward sled runner devices 26 are oscillatable upon the skeins 14, the chain 58 being of length to permit oscillation or rocking movement of said rear sled runner devices. Also, said chain 58 is adapted to prevent downward swinging movement of the forward portions 55 and upward swinging movement of the rearward portions 56 to an extent which would cause the sled runners 48 to turn over completely upon the skeins 14 as axes.

What is claimed is:

1. In a sled, a frame, an axle supporting said frame, sled runner devices supporting said axle and including spaced apart, horizontally disposed sled runners at the opposite sides of said sled and extending longitudinally thereof, means at an intermediate portion of said sled runner devices oscillatably connecting the axle and said sled runner devices to each other, and resilient means constituted as a part of said sled runner devices and engaged with said frame to limit the extent to which said sled runners can oscillate relatively to said frame, said resilient means including a member secured to and extending upwardly from a rearward portion of each of said sled runners, and an entity extending between and connected to upper portions of said members, said entity consisting of a rigid device adapted to engage said frame and flexible connections extending from said rigid device to each of said members.

2. The combination as specified in claim 1, wherein each of said members secured to and extending upwardly from a rearward portion of a sled runner is a threaded rod and said entity is secured upon said threaded rods to be adjustable longitudinally thereof.

3. In a sled, a frame, an axle supporting said frame, sled runner devices supporting said axle and including spaced apart, horizontally disposed sled runners at the opposite sides of said sled and extending longitudinally thereof, means at an intermediate portion of said sled runner devices detachably and oscillatably and separately connecting said sled runners to spaced apart portions of said axle, and resilient means constituted as a part of said sled runner devices and engaged with said frame to limit the extent to which said sled runners can oscillate relatively to said frame, said resilient means including a member secured to and extending upwardly from a portion of each of said sled runners at the rear of said means connecting said sled runners to said axle, and an entity extending between and connected to upper portions of said members, said entity having an intermediate part thereof adapted to engage said frame beneath the same and flexible end portions extending from said intermediate part to each of said members, and said flexible end portions and members being in spaced relation to said frame.

4. The combination as specified in claim 3, wherein each of said members secured to and extending upwardly from a rearward portion of a sled runner is a threaded rod and said entity is secured upon said threaded rods to be adjustable longitudinally thereof.

5. In a sled, runner devices adapted to support an axle of a vehicle, comprising spaced apart, parallel sled runners, a cradle supported upon an intermediate part of each of said sled runners, each of said cradles including an upwardly facing bearing surface adapted to oscillatably receive said axle, and means constituted as a resilient entity upon said sled runners and adapted to engage said vehicle to limit the extent to which the sled runners can oscillate relatively to the vehicle.

6. The combination as specified in claim 5, wherein said resilient entity includes members upstanding from said sled runners, and a connector between and secured to upper portions of said members, said connector including an intermediate rigid portion and flexible portions between said rigid portion and said members, respectively.

7. The combination as specified in claim 5, wherein said resilient entity includes members upstanding from said sled runners, and a connector between and secured to upper portions of said members to be adjustable longitudinally of the members, said connector including flexible portions thereof adjacent said members.

8. In combination, a vehicle having a tapering skein and a sled runner device for supporting said skein, said sled runner device including a sled runner and a cradle carried by said sled runner and adapted to be mounted upon said skein, said cradle being constituted as adjacent inner and outer cradle members each having an upwardly facing bearing surface, the bearing surface of one of said cradle members being at higher elevation than the bearing surface of another of the cradle members, and means for securing the cradle members to said skein.

JOHN H. ANDERSON.